(12) United States Patent
Dillingham

(10) Patent No.: US 11,703,412 B1
(45) Date of Patent: Jul. 18, 2023

(54) SYSTEM AND METHOD FOR DETECTING SEWER LATERAL LEAKS

(71) Applicant: Benjamin Dillingham, Petaluma, CA (US)

(72) Inventor: Benjamin Dillingham, Petaluma, CA (US)

( * ) Notice: Subject to any disclaimer, the term of this patent is extended or adjusted under 35 U.S.C. 154(b) by 325 days.

(21) Appl. No.: 16/863,990

(22) Filed: Apr. 30, 2020

(51) Int. Cl.
*G01M 3/04* (2006.01)
*B64C 39/02* (2023.01)
*B64D 47/08* (2006.01)
*G01M 3/24* (2006.01)
*G01M 3/00* (2006.01)
*B64U 10/13* (2023.01)
*B64U 101/30* (2023.01)
*F16L 101/30* (2006.01)

(52) U.S. Cl.
CPC ............ *G01M 3/04* (2013.01); *B64C 39/024* (2013.01); *B64D 47/08* (2013.01); *G01M 3/005* (2013.01); *G01M 3/24* (2013.01); *G01M 3/243* (2013.01); *G01M 3/246* (2013.01); *B64U 10/13* (2023.01); *B64U 2101/30* (2023.01); *F16L 2101/30* (2013.01)

(58) Field of Classification Search
CPC ......... G01M 3/04; B64C 39/024; B64D 47/08; B64C 2201/027; B64C 2201/127
See application file for complete search history.

(56) References Cited

U.S. PATENT DOCUMENTS

| | | | | |
|---|---|---|---|---|
| 3,752,983 | A * | 8/1973 | Yanez | G03B 17/565 250/214 LA |
| 4,138,856 | A * | 2/1979 | Orlowski | G01M 3/3227 62/181 |
| 4,651,558 | A * | 3/1987 | Martin et al. | G01M 3/38 73/40.5R |
| 4,772,789 | A * | 9/1988 | Maram et al. | G01M 3/38 250/330 |
| RE33,160 | E * | 2/1990 | Guthrie et al. | G01M 3/005 73/40.5R |
| 4,913,558 | A * | 4/1990 | Wettervik et al. | G01M 3/005 73/40.5R |
| 5,001,346 | A * | 3/1991 | Barkhoudarian | G01N 21/3504 250/338.5 |

(Continued)

FOREIGN PATENT DOCUMENTS

EP 3315937 A4* 5/2018 ............ B64C 39/02

OTHER PUBLICATIONS

Industrial Reviews, 4 Best Thermal Imaging Cameras for Water Leaks, https://industrial-reviews.com/thermal-imaging-camera-for-water-leaks/, IR Industrial Reviews, Mar. 7, 2021, 9 pages (Year: 2021).*

(Continued)

*Primary Examiner* — Clayton E. LaBalle
*Assistant Examiner* — Kevin C Butler
(74) *Attorney, Agent, or Firm* — Thomas M. Freiburger

(57) ABSTRACT

Sewer line and lateral inspections are made in order to detect leaks and improper connections, using steam injected into a section of sewer line. Thermal imaging of the vicinity indicates leaks and illegal connections.

7 Claims, 3 Drawing Sheets

(56) References Cited

U.S. PATENT DOCUMENTS

| | | | |
|---|---|---|---|
| 5,194,193 A * | 3/1993 | Humphreys et al. | F16L 55/164 |
| | | | 264/269 |
| 5,430,293 A * | 7/1995 | Sato et al. | G01M 3/38 |
| | | | 250/338.5 |
| 5,710,428 A * | 1/1998 | Ko | H04N 5/33 |
| | | | 257/E31.101 |
| 6,486,473 B2* | 11/2002 | Salapow et al. | H04N 5/33 |
| | | | 348/E.5025 |
| 6,545,704 B1* | 4/2003 | Olsson et al. | G01M 3/005 |
| | | | 348/E.7087 |
| 6,649,912 B2* | 11/2003 | Salapow et al. | H04N 5/2251 |
| | | | 348/E.5025 |
| 6,866,089 B2* | 3/2005 | Avila | G01M 3/002 |
| | | | 73/40 |
| 7,034,300 B2* | 4/2006 | Hamrelius et al. | G01J 5/084 |
| | | | 348/E.5029 |
| 7,250,603 B1* | 7/2007 | Nugent | G01J 5/0265 |
| | | | 348/E.5025 |
| 7,767,963 B1* | 8/2010 | Fujii | H04N 5/2253 |
| | | | 396/541 |
| 9,723,229 B2* | 8/2017 | Nguyen et al. | H04N 5/2256 |
| 9,883,084 B2* | 1/2018 | Nguyen et al. | G01J 5/04 |
| 10,113,956 B1* | 10/2018 | Li et al. | B64C 39/02 |
| 10,767,805 B2* | 9/2020 | Trapani et al. | F16L 55/1654 |
| 10,794,769 B2* | 10/2020 | Nguyen et al. | G01J 5/04 |
| 2002/0162963 A1* | 11/2002 | Lannestedt et al. | H04N 5/33 |
| | | | 250/353 |
| 2005/0115338 A1* | 6/2005 | McGrew et al. | E03F 3/06 |
| | | | 73/865.8 |
| 2005/0126263 A1* | 6/2005 | Avila | G01M 3/002 |
| | | | 73/40 |
| 2012/0314080 A1* | 12/2012 | Lee et al. | G01M 3/38 |
| | | | 348/E.7085 |
| 2016/0273698 A1* | 9/2016 | Kiest, Jr. | B29C 33/10 |
| 2017/0336281 A1* | 11/2017 | Waxman et al. | G01N 21/359 |
| 2021/0324614 A1* | 10/2021 | Pourzynal et al. | E03B 7/077 |

OTHER PUBLICATIONS

Infrared Imaging Services, Infrared pipe inspection, https://www.infraredimagingservices.com/infrared-steam-pipe-inspection-finds-leaks-buried-steam-pipes-and-condensate-lines-new-york-new/, May 9, 2017, 11 pages (Year: 2017).*

Mohammedhusen H. Manekiya et al., Leakage Detection and Estimation using IR Thermography, Intl. Conference on Communication and Signal Processing, Apr. 6, 2016-Apr. 8, 2016, 5 pages (Year: 2016).*

Mohd Shawal Jadin et al., Gas Leakage Detection Using Thermal Imaging Technique, 2014 UKSim-AMSS 16th Intl. Conference on Computer Modelling and Simulation, 2014, 5 pages (Year: 2014).*

* cited by examiner

SYSTEM AND METHOD FOR DETECTING SEWER LATERAL LEAKS

BACKGROUND OF THE INVENTION

This invention concerns detection of leaks in sewer lines or improper hookups to a sewer line, and in particular the use of injected steam, or hot air, for this purpose.

Municipal sewer systems include hundreds or thousands of laterals leading from houses or from commercial buildings to sewer lines. Periodically the laterals are inspected to detect leaks, typically underground, or to detect any improper hookups to the laterals, such as downspouts carrying runoff from the roof of a building or from other areas. Conventionally these inspections have been performed with smokers. An inspector lifts the cover from a manhole of a sewer line, usually in a street, places an adapter cover on the manhole and connects the smoker to blow smoke into the manhole. The outgoing line in the manhole can be temporarily blocked, as can the main line at the next manhole, at the end of the section being inspected. The smoke enters the effluent ends of laterals that lead from houses or other buildings. At the locations of leaks, smoke will seep up through the soil and indicate leak positions. In addition, if, for example, a resident has connected a runoff downspout or an area drain into the sewer lateral, smoke will emerge from the rainwater collection system, i.e. the upper end of a downspout or a drain, demonstrating the improper connection. The smoke test can also be used for leaks in the sewer mains.

These smoke tests, in most jurisdictions, require notification to local police, fire departments and homeowners. The emerging smoke can be an annoyance and a hazard. Also, the inspection process can require at least five workers.

SUMMARY OF THE INVENTION

The invention provides a more efficient procedure and system for inspecting sewer line laterals. A portable steam generator or boiler, such as used in newly laid pipelines to cure epoxy adhesives/sealants that have been applied at joints between pipe sections, is brought to the site of a sewer line where one or more laterals drain into the sewer. The boiler, a gas-fired device that boils water to produce steam, can be fitted to direct steam into a blocked section of the main sewer line. In a normal situation the steam can be directed into the manhole via an adapter cover. If the sewer line runs in both directions from the manhole, one section not being inspected is blocked off temporarily. The line is also blocked at the next manhole, at the end of the section of interest, so that the steam, under pressure, has nowhere to go except up the laterals, escaping at leaks. Where a block is needed the inspector enters a manhole and places the block. With the line blocked at the next manhole, the inspector activates the boiler to drive steam down into the manhole and into the closed section of line and up the laterals.

At the same time, the same or a different operator operates a thermal imaging camera and views a screen. In one preferred method this is done with a drone flown above the site of the lateral. Video is provided to the operator on a smartphone screen or tablet screen, or more preferably on a screen provided with the drone controls, and thermally-sensed images taken from the camera on the drone are fed to the control device and displayed on the screen. As in other drone cameras, the camera can be manipulated, as can the drone position, and the entire relevant area can be imaged, showing the environment and features of the landscape, as well as indications of precise positions on the landscape where steam may leak out of the pipe. Such pipes are normally in shallow underground locations, and the steam or water vapor will seep up through the soil. Breaks in the sewer lateral are thus detected and precisely located. As many as thirty buildings can be served in one section of main sewer line. In addition, the main line can be checked in this way.

In the same operation, or independently, the residences or other buildings served by the laterals can be inspected for illegal or unauthorized connections to laterals, such as for runoff water from a roof or area drains, catch basins or sump pumps in the building. Again, the infrared images on the screen will show any locations where steam/water vapor is emitted, indicating a downspout, drain, sump pump or other non-sewage facility is connected to the lateral, which typically is a violation of laws or regulations.

The test can also reveal illegal cross connections, where the city storm system is connected to the sanitary sewer.

In an alternate form of the invention a handheld thermal imaging device is used rather than a drone-carried camera.

The system and method of the invention can be operated by only two workers, although three may be needed if the ground-based system is used, to cover a large area. Local authorities need not be advised because smoke is not involved, only steam and water vapor. A primary object of the invention is to carry out a sewer lateral inspection efficiently and quickly and with fewer workers and regulatory requirements than needed with the existing smoke procedure.

In another embodiment of the invention, hot air can be used rather than steam.

DESCRIPTION OF PREFERRED EMBODIMENTS

Figure 1:
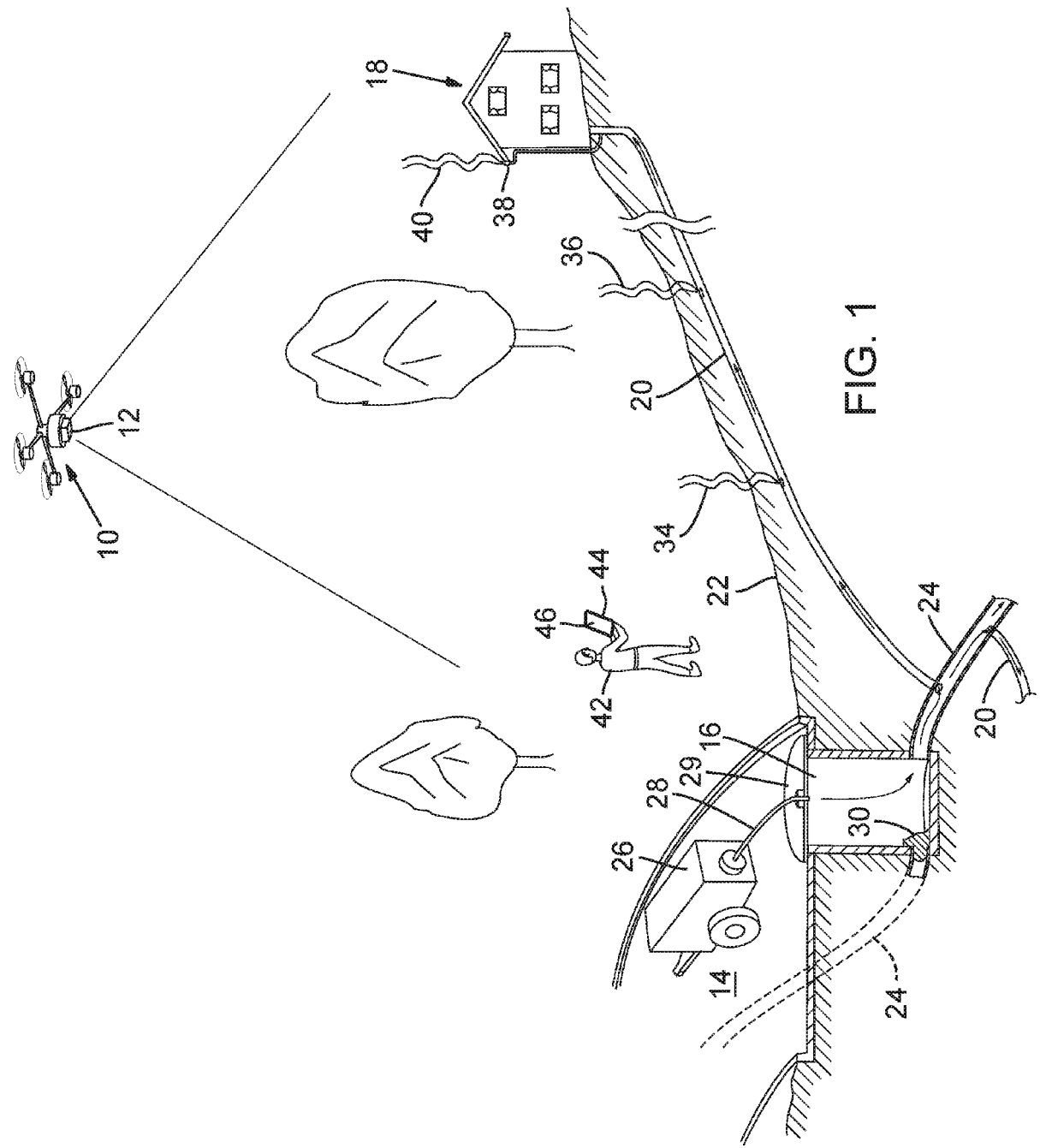
FIG. 1 is a schematic elevation view indicating the system and process of the invention, with a drone used to provide thermal images.

FIG. 1 shows schematically the method and system of the invention, in which a UAV or drone 10 has a thermal imaging camera 12 that takes overhead aerial thermal images of the landscape below, which includes a road 14 with a manhole 16. A building is shown at 18, which can be a residence, the building having a lateral sewer drain line 20 coming from the house and buried shallowly beneath the soil surface 22, draining into the main sewer line 24, although it could drain into the manhole 16.

A boiler 26 is brought to the site, being a steam generator with a delivery hose 28. Alternatively, a hot air blower could be used. The hose is connected to deliver steam into the section of main sewer line, with the laterals typically emptying into the main line between manholes. Steam can be directed into the manhole, using an adapter 29, after the main line 24 has been temporarily blocked as needed. Blocks 30 are placed in the manhole at any other openings to the main line other than to the section of interest, and on the main line at the other end of the section, which is shown on the right in the drawing. Alternatively, the steam could be injected through an opening in a temporary block on the main line in the manhole, to deliver the steam into the section of main line between manholes. Either way, steam is driven up into the laterals served by that section of sewer line.

In the event a lateral empties into a manhole, the procedure is somewhat different. Either both main line connections in the manhole are blocked, or the steam could be injected directly into the lateral.

FIG. 1 indicates that steam, or water vapor from the steam, seeps up through the soil at 34 and 36. Also, a rain litter or downspout 38 of the house is seen emitting steam or heat at 40. This indicates an illegal hookup to the sewer lateral 20.

An operator 42 holds a drone control 44 with a display screen 46. The device 44 controls the drone 10 flying over the scene, and also the drone's camera 12. The screen 46 displays an aerial image of the landscape in the vicinity of the manhole, the lateral and the house, with thermal imaging. Drone or camera movement may be needed to display all relevant areas. The images will indicate all features of the landscape, but will highlight areas of increased temperature, caused by the steam or heat emitted at leaks and from hookups.

Figure 2:
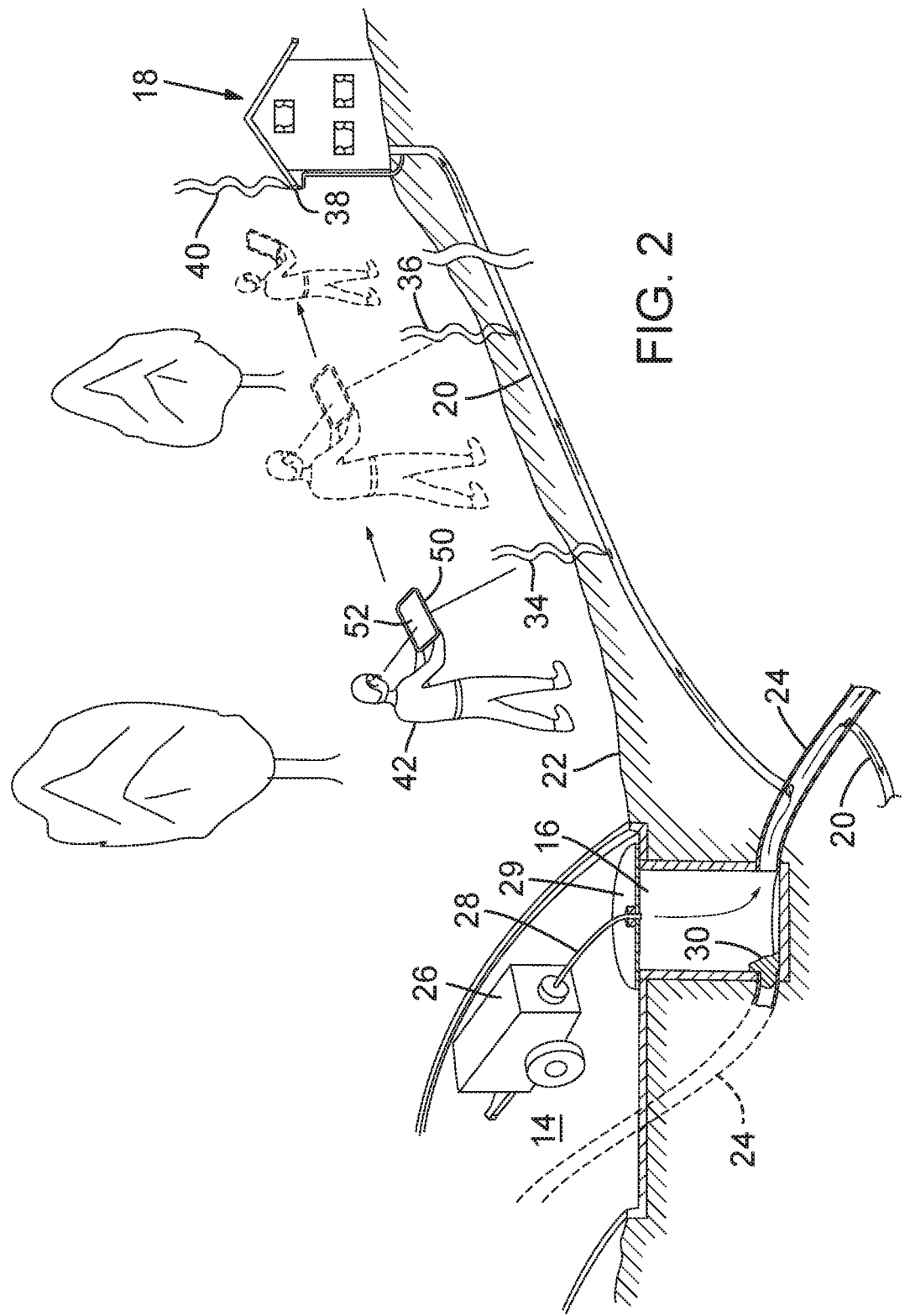
FIG. 2 is a schematic view similar to FIG. 1 but with an operator carrying a thermal imaging device, rather than use of a drone.

FIG. 2 shows a similar operation, but without the drone. The operator 42 has a hand-held thermal imaging or thermography device, indicated here as a housing 50 with a screen 52 that displays thermal images with a camera (not shown). The operator aims the camera along the landscape where the lateral is located, and can inspect the house 18 by aiming the camera and, if needed, bringing the camera closer. The system is similar to that described above, except that the inspector (or inspectors) is required to move to different locations in order to inspect a number of laterals and buildings. The drone is capable of imaging a much larger area and many more laterals and hookups.

Figure 3:
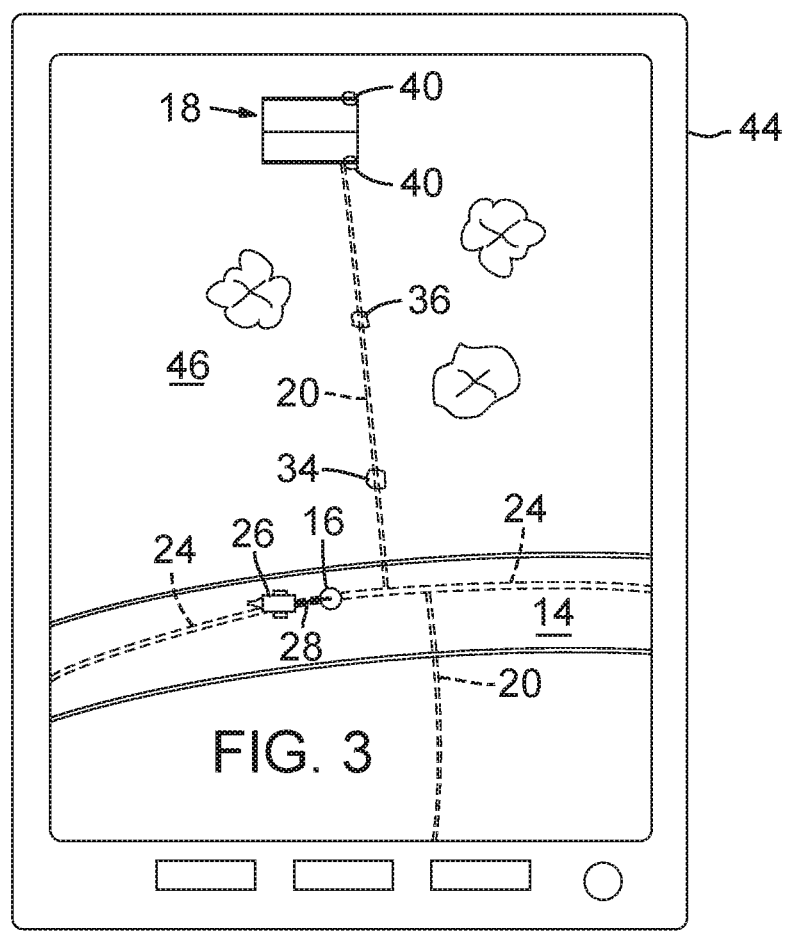
FIG. 3 is an example of a screen shot for a computer device displaying thermal images, particularly as imaged by a drone camera, and indicating steam escape locations.

FIG. 3 is a schematic indication of a screen display on the device 44 of FIG. 1. The screen 46 shows a thermal image, via infrared thermography or thermal video (still shots could be used if desired). The thermographic camera detects radiation in the infrared range of the spectrum and produces the thermogram. Typically areas of higher temperature are displayed with warmer, brighter colors, such as yellow, orange or red. Since infrared radiation is emitted by all objects with temperature above absolute zero, thermography will display the entire environment, whether visible to the eye or not, e.g. day or night. Variations in temperature are clearly displayed, and in the case of the example noted above, with lateral leaks at 34 and 36, these would typically be orange or red areas against a much darker background, such as blue or dark blue. The spectrum of displayed colors for particular temperature ranges can vary with different systems. The house 18 will typically show more heat than the natural environment, typically trees and vegetation. The house may show as light green or yellow. A steam emission, such as 38, will be shown as a higher temperature than the house itself, typically brighter than the surroundings.

For these inspections a record is usually needed, and the controller device or computer will store the thermal images as a record for each inspection. Often the record can be made on an overlay of an existing digital sewer location map.

As stated above, the main sewer line 24 can also be inspected for leaks using the system and method of the invention.

Rather than steam, hot air can be employed for the inspections described above.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A method for detecting leaks and/or improper hookups in underground laterals of a sewer system, comprising:
   using a portable boiler to produce steam and injecting the steam under pressure, into a blocked-off section of a main sewer line to which is connected at least one lateral extending underground and leading at an opposite end to a building served by the lateral, and
   flying a UAV with a thermal imaging camera above the lateral such that the thermal imaging indicates, to an operator with a display screen wirelessly connected to the camera and showing environment of the lateral, locations of increased temperature as the steam is injected, thus to identify leaks or openings underground in the lateral.

2. The method of claim 1, including flying the UAV over the building to indicate any improper hookups to the lateral.

3. The method of claim 1, further including inspecting the blocked-off section of sewer line for leaks using the thermal imaging.

4. A method for detecting leaks and/or improper hookups in laterals of a sewer system, comprising:
   using a portable device that produces a heated gas that comprises steam or hot air, injecting the heated gas under pressure into a blocked-off section of a main sewer line to which is connected at least one lateral extending underground and leading at an opposite end to a building served by the lateral, or injecting the heated gas into the lateral itself,
   providing a portable thermal imaging camera and displaying to an operator on a monitor screen connected to the camera, as the camera is moved in the vicinity of the section of sewer line, locations of increased temperature as the heated gas is injected, thus to identify leaks or openings underground in the lateral.

5. The method of claim 4, including inspecting the building for improper hookups as the camera is aimed at the building and surroundings.

6. The method of claim 4, wherein the thermal imaging camera and display screen are carried by an operator on the ground.

7. The method of claim 4, wherein the thermal energy camera is carried on a drone flown overhead and operated by the operator.

* * * * *